United States Patent Office 3,469,635
Patented Sept. 30, 1969

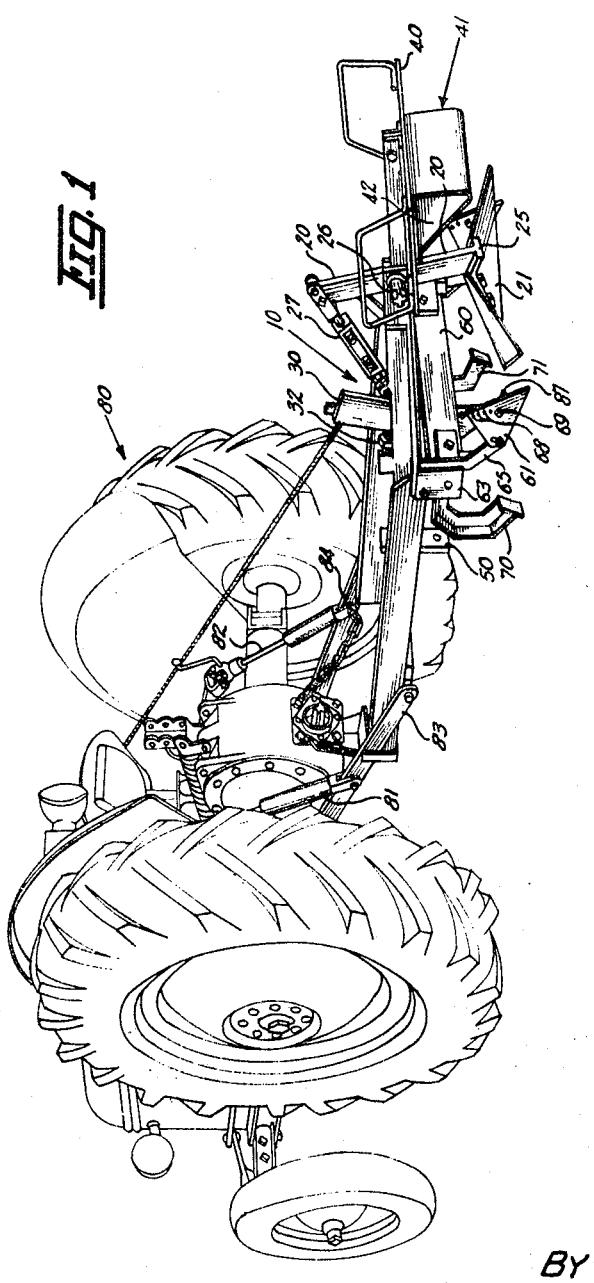

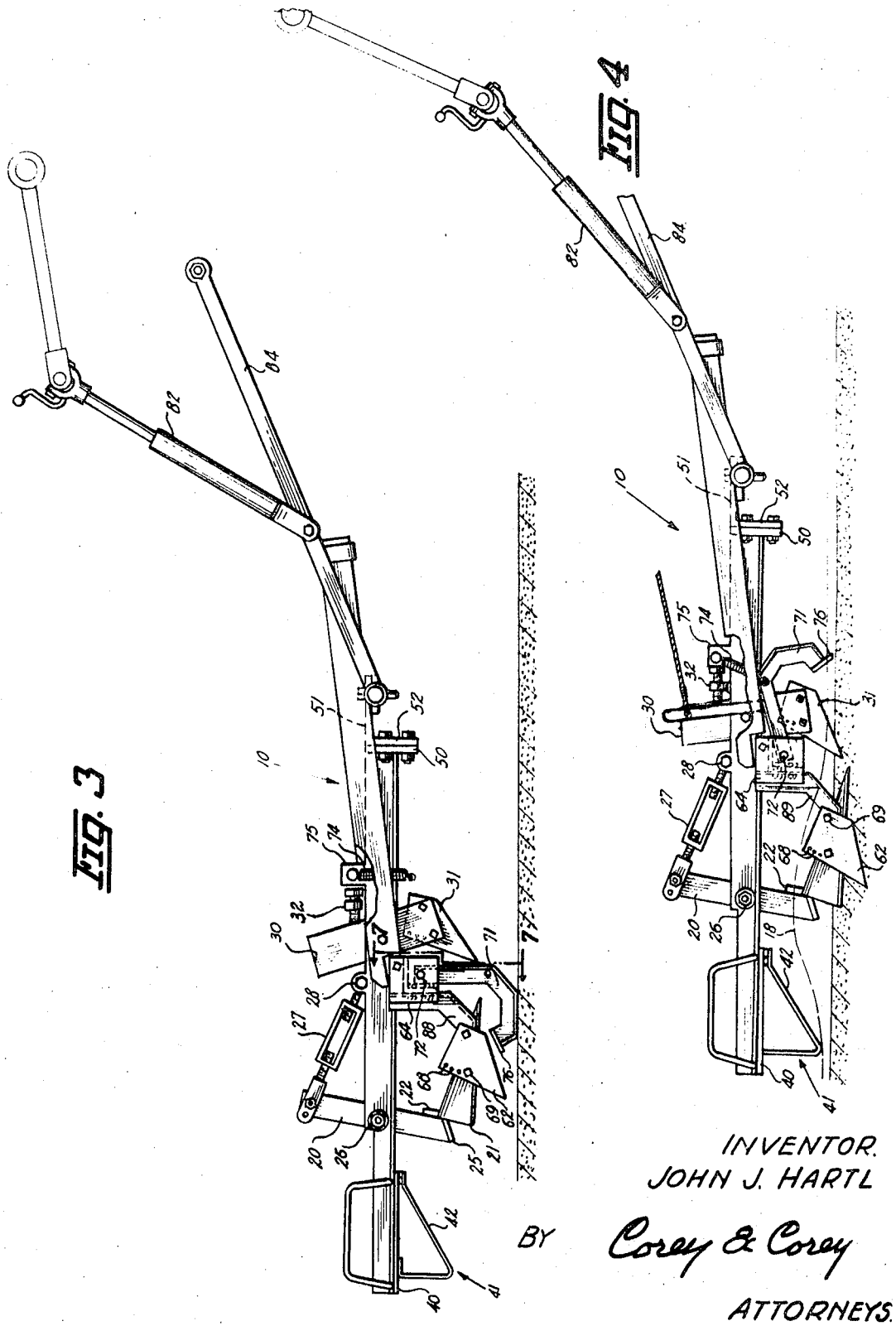

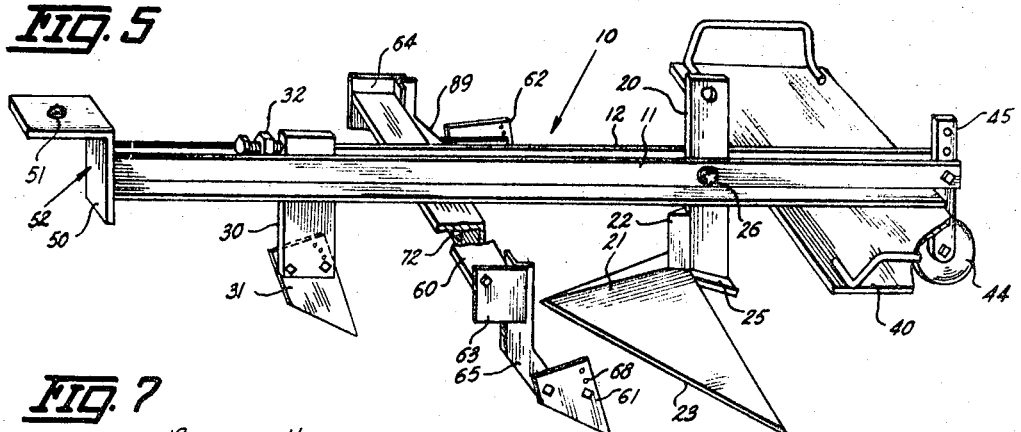
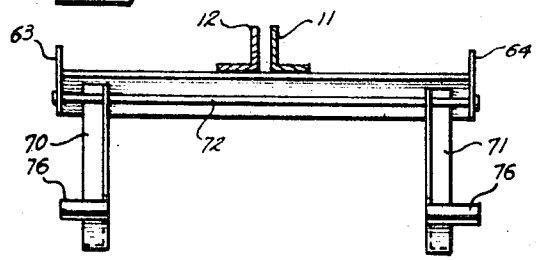
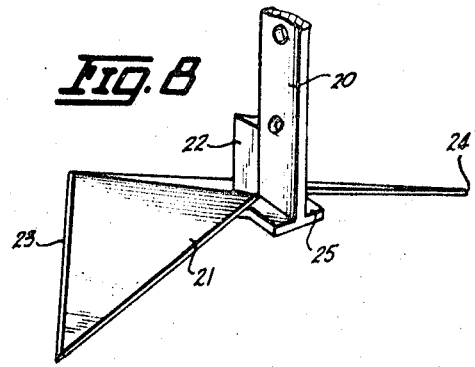

3,469,635
SOD CUTTING MACHINES
John J. Hartl, 2200 2nd St. SW.,
Cedar Rapids, Iowa 52404
Filed June 1, 1965, Ser. No. 460,093
Int. Cl. A01b 45/04, 39/20, 15/00
U.S. Cl. 172—19         2 Claims

ABSTRACT OF THE DISCLOSURE

A sod cutter having parallel bars forming a main frame and a cutting share mounted on the lower end of a tilting support pivotally attached between the parallel bars, and a turnbuckle at the upper end for tilting the support and thus the cutting share as desired to determine the depth of cut and draft according to the hardness characteristics of the ground beneath the sod. The knife is triangular to cut two strips of sod at a time, and knives are provided to cut and define the outer edges of the two strips. Other means are provided to regulate the depth of cut and the apparatus is preferably supported by supporting arms from the tractor.

This invention relates to sod cutting machines and has particular relation to a sod cutter adapted to be drawn by a tractor or the like.

One of the main objects of the invention is to provide a sod cutter which can be hitched to a tractor or the like prime mover by the means ordinarily employed for attaching other earth working equipment such as plows, harrows and the like.

One of the important objects and features of my invention is the employment of a share or blade and suitable cutting or slicing means for slicing two strips of sod at the same time, whereby the main cutting edges may be swept back but are balanced one against the other and where the sod is lifted or tilted, one strip to one side and the other to the other side, to permit passage of the central share support member.

Another main object of the invention is to provide a high capacity sod cutter which may be powered by prime movers, tractors and the like employed for other purposes, thus reducing the cost of the sod cutter.

Other and further features and objects of the invention will be more apparent to those skilled in the art upon a consideration of the accompanying drawings and following specification, wherein is disclosed a single exemplary embodiment of the invention, with the understanding, however, that such changes may be made therein as fall within the scope of the appended claims, without departing from the spirit of the invention.

In said drawings:

FIGURE 1 is a view in perspective of a sod cutter attached to a conventional tractor.

FIGURE 2 is a plan view of the sod cutter and the actuating portion of the tractor which may be employed for lifting the sod cutter.

FIGURE 3 is a view in side elevation of the sod cutter shown in FIGURE 2 with the cutter in raised or carried position.

FIGURE 4 is a view of the sod cutter as it is first engaged to the ground for cutting sod.

FIGURE 5 is a view in perspective in schematic relation of the main frame and cutting members, illustrating the relation of sod cutting and trimming members, and modification of sod pressing means.

FIGURE 6 is a schematic diagram illustrating the relation between the trimming knives and the cutting share which cuts the strips of sod.

FIGURE 7 is a view as seen along the line 7—7 showing my method of attaching skids to the cross beam.

FIGURE 8 is a view in perspective of the cutting share and its supporting member.

Referring now to the drawings:

The main frame of the sod cutter is indicated at 10 and preferably employs a pair of oppositely disposed angles 11 and 12 placed back to back with the flanges extending outwardly from the lower edges and spaced apart sufficiently to permit location between the vertical portions of the angle iron of the cutter supports including a block-like vertical supporting member 20 for supporting the sod cutting share 21, as will be more particularly hereinafter described.

The adjacent walls of the frame also support and engage a second block-like knife supporting member 30 for supporting the central slicing or trimming knife 31 which splits the sod for the first operation of cutting a vertical cut in advance of the sod cutting share 21 and centrally located therewith. The sod and strips of sod are indicated by dotted lines 18 and 19.

The angles 11 and 12 are joined at the rear by means of a plate 40 welded, or otherwise secured, to the underside of the angles. This plate, as will hereinafter be described, is adapted for carrying weights such as sacks of sand or the like for varying the pressure holding the cutting share 21 in the ground. The front end of the main frame 10 is joined by means of a vertical plate 50 having a horizontal, forwardly extending portion 51 with an opening therein for bolting or fastening the cutter to the tractor and thus forms a hitch or drawbar 52.

The main frame members are also joined together in spaced relation by a cross bar support member 60 which has means at either end for supporting the left slicing member or knife 61 and the right slicing member or knife 62 for vertical slicing of the edges of the sod strips in advance of the sod cutting share 21.

FIGURE 8 illustrates in perspective the support member 20 for supporting the share 21, and also a splitting knife 22 located just in front of the support member to assist in splitting the sod as it passes up over the share.

FIGURE 6 illustrates, also in more or less schematic relation, how the splitting member of knife 31 first splits between the two selected strips of sod as the sod cutter is drawn forwardly, and how the knives 61 and 62 separate the selected areas which will become the sod strips.

As the cutting share moves forward the two cutting edges 23 and 24 of share 21, when properly positioned by the main frame, will cut the sod loose from the ground beneath.

It is to be noted that the cutting share 21 is bent or creased upwardly from the point to the middle rear to enable the supporting plate or shoe 25, which extends underneath the share and is engaged to the bottom edge of plate 20, to clear the ground and ride on top of the ground after the sod has been cut away.

The upwardly bowed or bent shape of the plate 21 at its rear edge raises the two adjoining edges of the sod and of course the sod strips to a slightly tilted and complementary position, the left one to the left inclination and the right to the right, so that their projected vertical width is sufficiently decreased as to permit ready passage of the vertical support bar 20. This action is facilitated by the splitter 22. After the passage of the sod cutting share 21, the strips of sod may then drop back to the flat position on the ground, but of course sheared from it.

This flattening action may be increased by the sled-like blade 41 fastened underneath the cross plate 40. This plate has a downwardly sloping front portion 42 and a vertical rear portion 43.

In another embodiment of this sod pressing means, one or more rollers 44 may be employed and these rollers are fastened by means of an adjustable member 45 to the rear of the main frame 10 and may not only be used for pressing down the sod after it has been cut, but also may be used for transporting the cutter about since the cutter may be manually raised at the front end and pushed or towed about on the wheels, much in the manner of a wheelbarrow.

While the sod cutter may be employed with a tractor, such as shown in FIGURE 1, which is equipped with hydraulic lifting attachment carrying means so that the sod cutter may be raised and carried about, there may be occasions when the prime mover or other tractor means will not be equipped with such attachment lifting apparatus; so I have provided a pair of retractable shoes 70 and 71 which are rotatably mounted on the rear face of the cross bar support member 60 as illustrated in FIGURE 7, these members being mounted on the cross shaft 72 which is in turn pivotally engaged within the end members 63 and 64 for rotation into the sod cutter carrying position shown in FIGURE 3, or the disengaged position shown in FIGURES 1 and 4.

In the disengaged position shown in FIGURE 4, a spring 74 attached at one end to the post 75 and at the other end to the skid, supports the skids, but if the sod cutter is let down and the sod cutter backed up, the shoes 76 will dig into the sod and cause tthe skids to be moved to the engaged or carrying position shown in FIGURE 3.

Locking bolt 32 holds the post 30 and cutter 31. The share supporting member 20 is attached to the main frame by a pivot shaft illustrated at 26 and may be tilted as desired by means of the turnbuckle 27, which is pivotally engaged to the upper end of the support at the back end and to the pivot bolt at 28 at the front end.

The locking bolt 32 of course may be employed to raise and lower the front cutting knife 31 to the desired position, and the side cutting knives 61 and 62 are engaged on bent frames 65 and 89. These frames are secured, as shown in FIGURES 3 and 4, by slotted and bolted connections to the cross members as illustrated at 66 and 67.

A series of openings 68 are provided in each of the knives so that the bolt 69 may be removed and replaced in any one of the openings to tilt the knives as desired.

In FIGURES 1, 2, 3 and 4 I have illustrated how the sod cutter may be connected to the conventional attachment supporting members of the tractor 80. This well known tractor is equipped with hydraulic jacks 81 and 82 and these jacks in turn are engaged on lift arms 83 and 84. The drawbar or tongue 52 may be bolted either on the upper or lower side of the tractor drawbar 85 by means of bolt 86.

An important part of the knife supporting structure are the shoes illustrated at 87. These shoes are a part of the frames 65 and 89 and will let the knives go into the sod only as deep as the shoes will permit.

In use the sod cutter may be dropped to the ground and then pulled forward by the tractor and the share will cut the sod. The knives will separate it into two strips.

If desired, weights such as sand bags 87 may be applied to the rear of the sod cutter to apply greater or lesser pressure to the share to accommodate different hardnesses of soil and different soils.

If desired, the front knife may be lowered well below the others and the sod cutter drawn across the sod field to score the sod crosswise so it may be removed by the cutting operation in 10-ft. or other desired lengths.

In use the sod cutter cuts two strips of sod at a time and is very fast because the tractor or other motive power has only the job of towing the sod cutter, and once properly engaged, the sod cutter will cut long strips of sod clear across a field with only one operator, the tractor operator, to do the sod cutting. No sod is lost between adjacent strips.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a sod cutter, a main frame including a pair of parallel frame members, a support member pivotally engaged between the frame members with the lower portion thereof projecting downwardly and having an approximately horizontally extending triangular cutting share supported in position to cut the sod loose, an extensible adjustable member having one end pivotally secured to the upper end of the support member and the other to the main frame to tilt the share as desired, means for attaching the main frame to the tractor, and skids outboard of the main frame on each side thereof to permit carrying of the sod cutter from place to place by skidding it on the skids.

2. In a sod cutter, a main frame including a pair of parallel frame members, a support member pivotally engaged between the frame members with the lower portion thereof projecting downwardly and having an approximately horizontally extending triangular cutting share supported in position to cut the sod loose, an extensible adjustable member having one end pivotally secured to the upper end of the support member and the other to the main frame to tilt the share as desired, means for attaching the main frame to the tractor, and an inclined plate on the rear of the main frame to engage the ground behind the cutter to assist in regulating the depth of cut.

References Cited

UNITED STATES PATENTS 475,042  5/1892  Hurley et al. _____ 172—733 X

FOREIGN PATENTS 651,579  11/1962  Canada.
626,357  12/1962  Belgium.

ANTONIO F. GUIDA, Primary Examiner

ALAN E. KOPECKI, Assistant Examiner

U.S. Cl. X.R.

172—733, 739, 611, 764